United States Patent [19]

Nakaya et al.

[11] Patent Number: 5,627,311

[45] Date of Patent: May 6, 1997

[54] TRANSPORTABLE THREE-DIMENSIONAL CALIBRATION WIND TUNNEL SYSTEM, VERIFICATION METHOD OF FLIGHT CONTROL SYSTEM AND FLIGHT SIMULATOR USING SAME

[75] Inventors: Teruomi Nakaya, Machida; Osamu Okamoto, Higashi-Yamato; Naoaki Kuwano, Chofu; Seizo Suzuki, Mitaka; Shuichi Sasa, Hachioji; Hidehiko Nakayasu, Kashiwa; Masakazu Sagisaka, Hino, all of Japan

[73] Assignees: National Aerospace Laboratory of Science & Technology Agency; National Space Development Agency of Japan (NASDA), both of Tokyo, Japan

[21] Appl. No.: 517,969

[22] Filed: Aug. 22, 1995

[30] Foreign Application Priority Data

Aug. 23, 1994 [JP] Japan .................................. 6-219581

[51] Int. Cl.$^6$ .......................... G01M 9/02; G01M 9/04; G01M 17/00
[52] U.S. Cl. .............................. 73/147; 73/865.6
[58] Field of Search ...................... 73/147, 865.6; 34/97, 99, 666

[56] References Cited

U.S. PATENT DOCUMENTS

| | | | |
|---|---|---|---|
| 1,528,917 | 3/1925 | Fales | 73/147 |
| 3,027,760 | 4/1962 | Holderer | 73/147 |
| 4,366,368 | 12/1982 | Stephens | 34/666 X |
| 4,836,019 | 6/1989 | Hagen et al. | |
| 5,241,974 | 9/1993 | Tsai | 34/97 X |
| 5,423,209 | 6/1995 | Nakaya et al. | |
| 5,501,101 | 3/1996 | Purcell | 73/147 |

*Primary Examiner*—Richard Chilcot
*Assistant Examiner*—Joseph L. Felber
*Attorney, Agent, or Firm*—Armstrong, Westerman, Hattori, McLeland & Naughton

[57] ABSTRACT

A transportable three-dimensional calibration wind tunnel system consists of a small wind tunnel portion for creating a three-dimensional airflow having a suitable wind velocity, and a two-axis rotational deformation device portion for causing the wind tunnel portion to effect a conical motion with a nozzle blow port being in close proximity to an apex to suitably change a flow angle. The two-axis rotational deformation device includes a β-angle rotational deformation device having a β-angle deformation base supported to be rotated horizontally, and an α-angle rotational deformation device having an α-angle deformation base supported to be rotated vertically. A rotational axis of the α-angle deformation base, a rotational axis of the β-angle deformation base and a center axis of the small wind tunnel portion are arranged so that they intersect at a point. When verifying a flight control system of an aircraft using the transportable three-dimensional calibration wind tunnel system, the nozzle blow port of the three-dimensional calibration wind tunnel system is positioned at the extreme end of an air data sensor probe provided on the aircraft, and the three-dimensional calibration wind tunnel system and an on-board control computer of the aircraft are connected to an outboard control computer so that a suitable three-dimensional airflow is generated by the three-dimensional calibration wind tunnel system to verify the operation and function of the control surface in the stopped state on the ground.

6 Claims, 12 Drawing Sheets

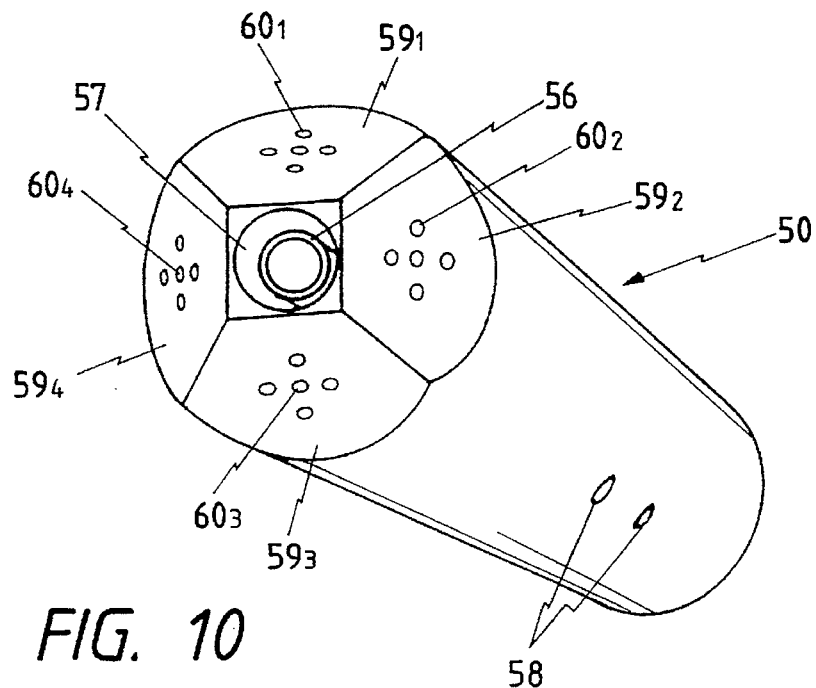
FIG. 10
FIG. 11A
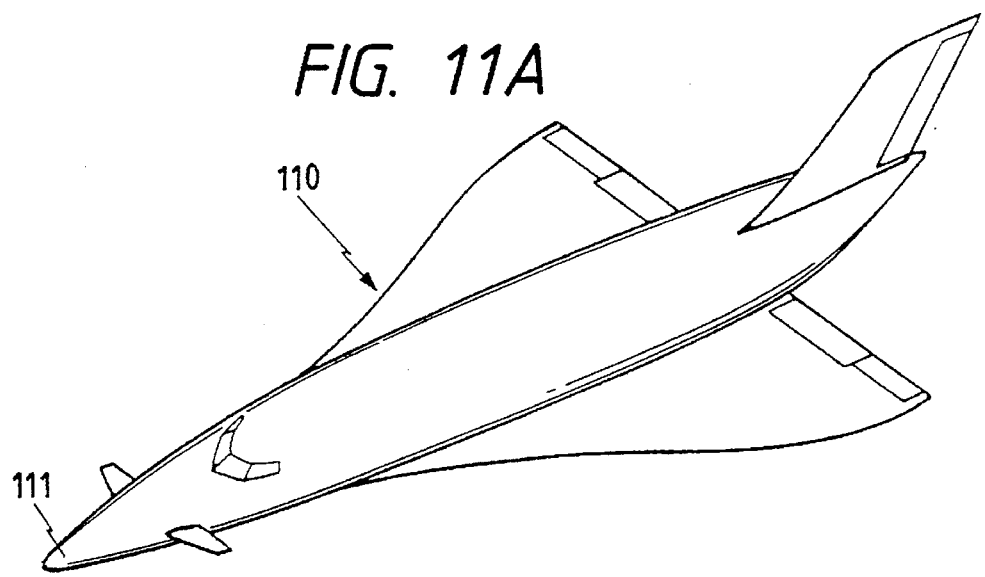
FIG. 11B
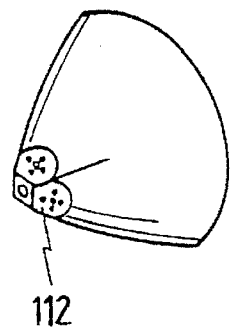

TRANSPORTABLE THREE-DIMENSIONAL CALIBRATION WIND TUNNEL SYSTEM, VERIFICATION METHOD OF FLIGHT CONTROL SYSTEM AND FLIGHT SIMULATOR USING SAME

BACKGROUND OF THE INVENTION (1) Field of the Invention

The present invention relates to a transportable three-dimensional calibration wind tunnel system having a wind tunnel function, a verification method of flight control system of an aircraft using said transportable three-dimensional calibration wind tunnel system, particularly an air active control aircraft which corresponds to the disturbance detection (hereinafter merely referred to as an air active control aircraft), and a flight simulator using said transportable three-dimensional calibration wind tunnel system.

(2) Description of Related Art

Conventionally, as a system for evaluating various aerodynamical characteristics and for testing and verifying air meters and the strength of members in the development of aircraft, a wind tunnel is considered. The conventional wind tunnel is a large fixed facility. An article to be tested is placed within a measuring portion of the wind tunnel to perform the air test. Therefore, if the article to be tested is large, for example, such as an aircraft, the test can be made using a scale model. Accordingly, for example, a Pitot or the like is mounted on a real airframe, in which state the air characteristics cannot be verified. Further, what sensor signal with respect to the change in air the Pitot generates, and how the sensor signal is transmitted to a control system within the airframe are impossible to verify without a real flight test utilizing a real airframe.

On the other hand, a flight simulator is used for training for the control by a pilot of an aircraft or training for the operation of the system by a flight engineer. In the conventional flight simulator, in the training situations the atmospheric conditions, such as for example, the atmospheric pressure, wind direction, wind speed and so on, and the flight conditions, such as the altitude, velocity, position, attitude and so on, are predetermined or these conditions are suitably set from an instructor's operation panel whereby a motion simulation apparatus, a control loading simulation apparatus and a visual simulation apparatus are actuated in accordance with the program from the operational situations by the operation of control to conduct the training by way of simulation feeling. Accordingly, all the conventional flight simulations are based on the predetermined data set. For example, the motion of an aircraft resulting from the actual change in air, which changes every second, cannot be simulated.

Moreover, in the conventional flight simulator, the atmospheric data are set by forming the atmospheric data into a numerical model. However, it is difficult to completely form the actual atmosphere into a numerical model, and therefore there is a difference from the actual atmospheric conditions. Therefore, it is difficult to reproduce the same conditions as the actual atmospheric disturbances, for example, such as a gust of wind, a windshear or the like. Accordingly, it has been insufficient for training a pilot to maintain stabilized flight in the event of being caught in the atmospheric disturbance as described.

On the other hand, with the recent advancement of a computer and control technology, there has been advanced by various countries research and development for an active control aircraft for positively controlling flight by way of a computer control with respect to the change in air in order to improve the safety and the comfortableness of the ride in the aircraft. Preferably, the verification of the control system in the actual flight of the air active control aircraft is accomplished by actually driving the airframe and generating a sensor signal with respect to the atmospheric change. In the case of an extremely small airframe, this can be done even by the conventional wind tunnel test but cannot be done in case of a real airframe. Further, actual flight evaluations cannot be made with the current state of research and development.

In view of foregoing, a system for performing the verification of a control system by sending a simulated electrical signal to the control system in place of a real sensor signal is generally employed. This system can suitably generate a signal although the system has a problem in that if is difficult to cope with a signal different in properties from the real sensor signal, a time lag and so on, thus being unsatisfactory as the verification system.

Further, the air active control aircraft presently under development is directed toward detecting the motion state of the aircraft resulting from the change in air characteristics and to optimally control the control surface and the engine thrust by means of a computer on the basis of the detected results. Therefore, there occurs a time lag between a change in aerodynamic force and a control of the airframe motion. Accordingly, it is impossible to detect the change in aerodynamic force due to the sudden occurrence of the air disturbance to perform the flight stabilization control which corresponds to the disturbance detection (hereinafter merely referred to as the flight stabilization control) before the airframe is affected thereby.

One of the reasons why the flight control cannot be made at the real time in response to the change in air characteristics is that aero meters which are loaded on the real airframe to positively measure the change in air characteristics during the flight have not yet been developed.

Therefore, in the past, in the control of taking off and landing, a pilot receives air information from a control tower to control the aircraft. However, control with a slight delay with respect to a crosswind, a gust of wind or windshear occurring suddenly sometimes leads to trouble. Therefore, it is necessary that the aircraft to obtain the air flight vector with respect to the change in air characteristics in a real time, and to take it into the control system so that the flight motion caused by the change in air characteristics is accurately predicted to produce a control law for a fast response air characteristics flight balance control.

The present inventors have previously proposed a truncated pyramid-shape Pitot probe capable of detecting an air velocity vector during the flying with a single probe and an air flight velocity vector measuring apparatus using the probe (see U.S. Pat. No. 5,423,209).

This invention solves the aforementioned problems encountered in the development of an air active control aircraft making use of the above-described truncated pyramid-shape Pitot probe and the air flight velocity vector measuring apparatus using the probe.

SUMMARY OF THE INVENTION

It is a first object of the present invention to provide a transportable three-dimensional calibration wind tunnel system capable of generating a three-dimensional calibration airflow similar to a wind tunnel test with respect to a real airframe to effect an air active test in connection with the real airframe.

It is a second object of the present invention to provide a verification method of an air active control system capable of accurately performing verification of operation and function of a control surface with respect to the change in air characteristics, and the verification and evaluation of a control law or the like in connection with an aircraft, particularly an air active control aircraft in the stopped state on the ground using the three-dimensional calibration wind tunnel system.

It is a third object of the present invention to provide a flight simulator capable of simulating a flight motion on the basis of the actual change in air of a gust of wind.

The three-dimensional calibration wind tunnel system according to the present invention comprises a small wind tunnel portion for creating a three-dimensional calibration airflow having a suitable wind velocity, and a two-axis rotational deformation device portion for causing said wind tunnel portion to effect a conical motion with a nozzle blow port acting as an apex to suitably change a flow angle. The small wind tunnel portion is comprised of an airflow generating tubular portion, a honeycomb type straightener, and a nozzle, said airflow generating tubular portion being provided with an axial fan constituting a movable blade, a stationary blade, and an electric motor for driving the axial fan. A multihole turbulence plate is detachably mounted on the blow port of the nozzle, if necessary.

The two-axis rotational deformation device is comprised of a β-angle rotational deformation device having a β-angle deformation base supported to be rotated horizontally, and a α-angle rotational deformation device having a α-angle deformation base supported to be rotated vertically. A rotational axis of the α-angle deformation base, a rotational axis of the β-angle deformation base and a center axis of the small wind tunnel portion are arranged so that they intersect at a point.

The two-axis rotational deformation device is preferably an active type two-axis rotational deformation device in which the α-angle deformation base and the β-angle deformation base are controlled and driven by drive devices, respectively, but may be of a passive type two-axis rotational deformation device in which the α-angle deformation base and the β-angle deformation base can manually set angles, and at least the α-angle deformation base has a free vibration mechanism comprised of a free vibration spring and an adjusting portion.

Further, the verification method of a flight control system of an aircraft according to the present invention is the verification method of a flight control system for verifying on the ground the flight control system of an aircraft on which is loaded an air flight velocity vector measuring device having an air data sensor probe, characterized in that the nozzle blow port of the transportable three-dimensional calibration wind tunnel system comprising the small wind tunnel for creating the three-dimensional calibration air having a suitable wind velocity and the two-axis rotational deformation device for causing the wind tunnel to effect a conical motion with the blow port being an apex to suitably change the flow angle is positioned at the extreme end of the air data sensor probe provided on the airframe, and the transportable three-dimensional calibration wind tunnel system and an on-board control computer of the aircraft are connected to an out-board computer to verify the operation and function of the control surface.

The aforementioned verification of the operation and function of the control surface can be accomplished by the steps of: causing the transportable three-dimensional calibration wind tunnel system to generate the air disturbance on the basis of an air disturbance signal issued by the on-board control computer, detecting said air disturbance by the air data sensor probe to thereby create a change in signal of a three-dimensional true airspeed detection system, generating control amounts from various data bases stored in the on-board control computer and flight control law, and determining whether or not each control surface angle obtained by controlling the control surface amount adequately corrects the airframe motion due to the change in air imparted by the transportable three-dimensional calibration wind tunnel system.

Alternatively, the flight vector detected by the three-dimensional true airspeed detection system is presented to a pilot by a monitor provided in a cockpit, and the control surface is allowed to effect motion by means of a signal generated by the manual operation of the pilot so as to evaluate and verify the controllability and to evaluate and verify the control characteristics including the actions of the pilot. In addition, an air disturbance signal is generated by the on-board control computer and an operation disturbance signal is generated whereby the evaluation and verification of the performance and the evaluation and verification of the operational characteristics including the actions of the pilot can be also accomplished..

The aforementioned verification method for the flight control system can be applied to not only an active control aircraft with an engine but also an active control aircraft without an engine in which the air flight stabilization control is effected merely by the control-surface control.

The flight simulator according to the present invention comprises a three-dimensional calibration wind tunnel system composed of a simulation cockpit provided with a simulation operating seat and a visual simulation device, a motion simulation device for causing the simulation cockpit to effect three-dimensional motion, a small wind tunnel for creating a three-dimensional calibration airflow having a suitable airspeed and a two-axis rotational deformation device for causing the wind tunnel to effect conical motion with a nozzle blow port at an apex, a three-dimensional true airspeed detection system comprising an air data sensor probe for detecting a three-dimensional calibration air generated by the three-dimensional calibration wind tunnel system as air information and an air flight velocity vector processor for operating the velocity vector from atmospheric information detected by the air data sensor probe, and a control command section having a flight simulator computer, characterized in that said three-dimensional calibration wind tunnel system and said air data sensor probe are arranged so that the extreme end of the air data sensor probe is positioned in the central portion of the extreme end of the nozzle blow port, the three-dimensional calibration wind tunnel system is controlled in air speed and direction of wind by a flow generator control computer, an output of the three-dimensional true airspeed detection system is input into said flight simulation computer, and a control signal based on the flight velocity vector is sent to the simulation cockpit and the motion simulation device.

As the air data sensor probe, it is preferable to employ a truncated pyramid-shape Pitot probe. The configuration is such that the flow generator control computer receives real flow information from a real airport, the three-dimensional calibration wind tunnel system is controlled according to the real wind information, and the airflow generator generates the same airflow as that of the real airport in real time to effect simulation. Further, an aerodrome information of wind condition RAM is provided in the control command section and the wind information of the real airport is input and stored in the aerodrome information of wind condition RAM whereby the flight simulator computer calls the wind information to generate the airflow conditions similar to that of the real airport in the three-dimensional calibration wind tunnel system to effect simulation.

Since the three-dimensional airflow generated by the three-dimensional calibration wind tunnel system is in a limited region of airspeed due to the noise problem, the airflow generation ability and so on, a predetermined quantity of flight velocity vector signals from the air flight velocity vector processor are continuously shifted to generate a simulated airspeed different from the actually generated airspeed in the control command in the control command section. A velocity vector scaling processor scaling-processes the flight velocity vector signal from the operation processor on the basis of the aforementioned shift amount, thereby enabling the simulation in a wide range of airspeeds.

The three-dimensional calibration wind tunnel system and the air data sensor probe may be loaded on the motion table of the motion simulation device or may be provided outside the motion table.

BRIEF DESCRIPTION OF THE DRAWINGS

FIG. 10 is a perspective view of a truncated pyramid-shape Pitot probe;

FIG. 11 (a) is a schematic view of the air active control aircraft according to a further embodiment, and FIG. 11 (b) is an enlarged view of the nose portion thereof;

DESCRIPTION OF THE PREFERRED EMBODIMENTS

FIGS. 1 to 5 show various embodiments of the transportable three-dimensional calibration wind tunnel system according to the present invention.

The transportable three-dimensional calibration wind tunnel system 1 according to the present invention is composed of a small wind tunnel portion 2 for creating an airflow with even speed and direction of the wind and less variation in speed, and an active two-axis rotational deformation device 3 for causing the wind tunnel portion to effect conical motion with a nozzle blow port 14 being an apex to suitably change a flow angle.

Figure 3:
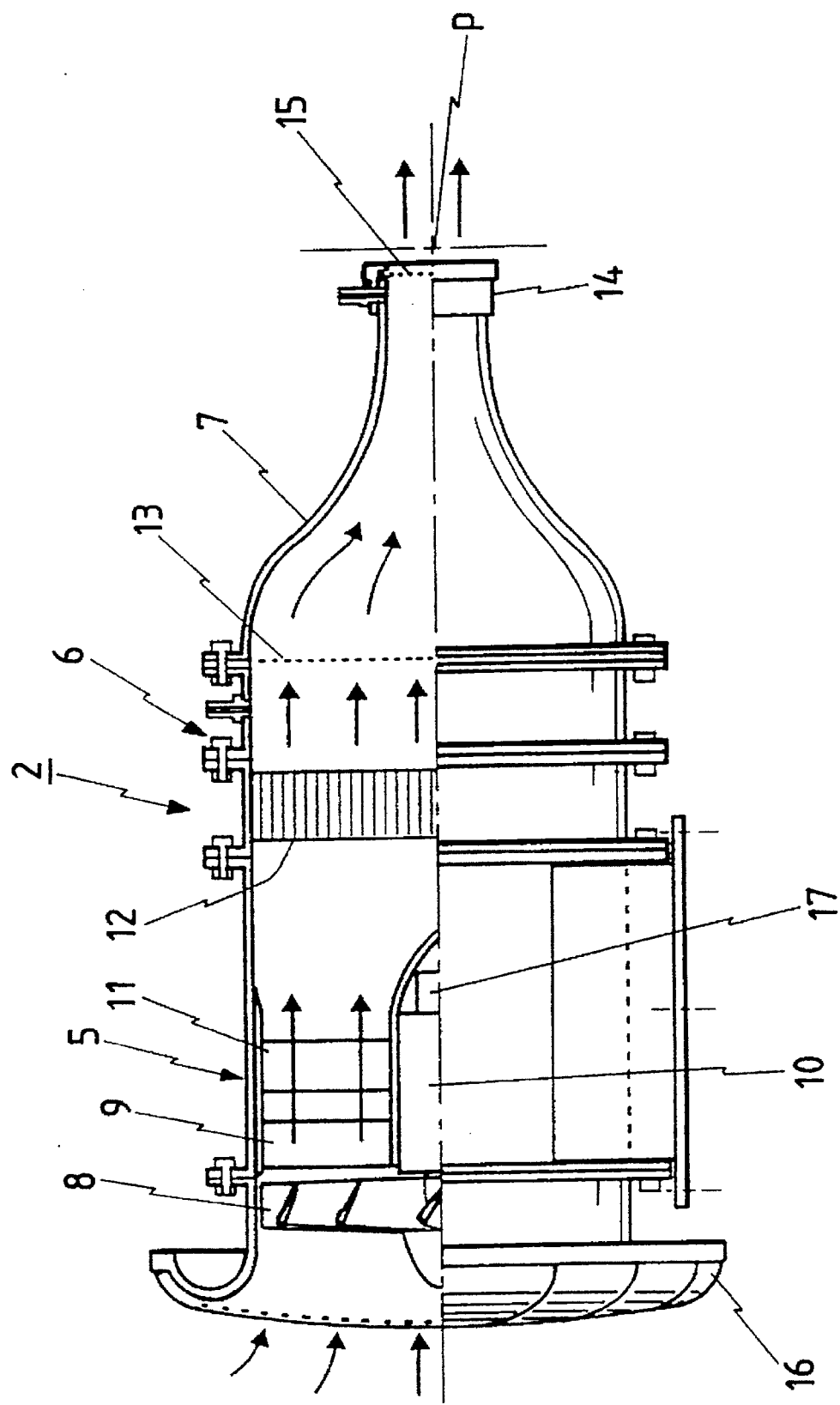
FIG. 3 is a partially sectional side view of a wind tunnel of the transportable three-dimensional calibration wind tunnel system shown in FIG. 1.
Figure 4:
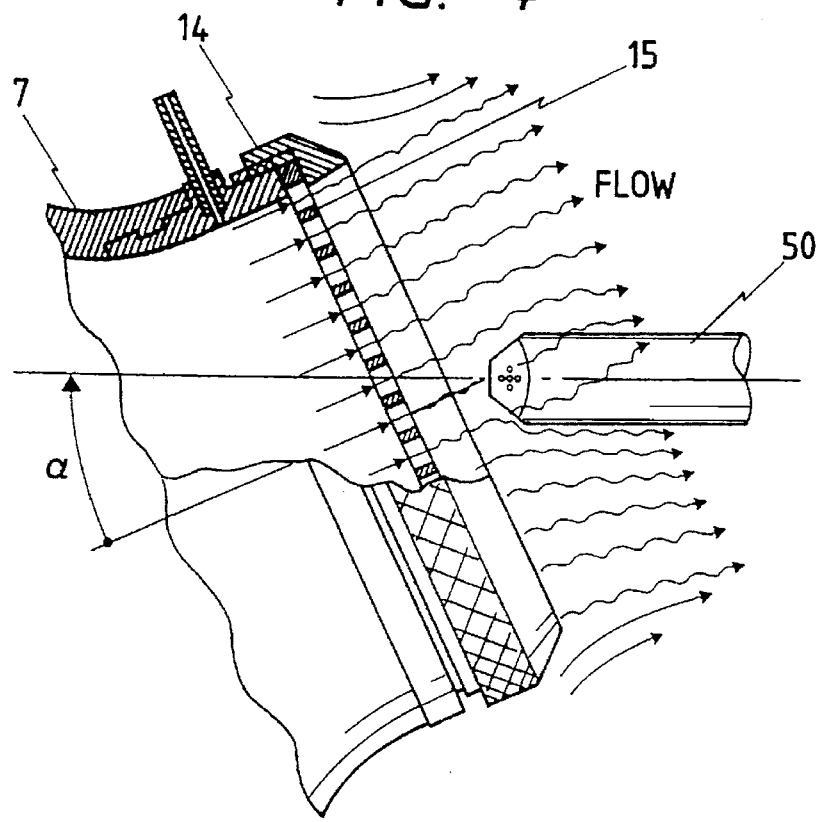
FIG. 4 is a partially sectional side view of a nozzle blow port in the state where the multi-hole turbulence plate is mounted.
Figure 5:
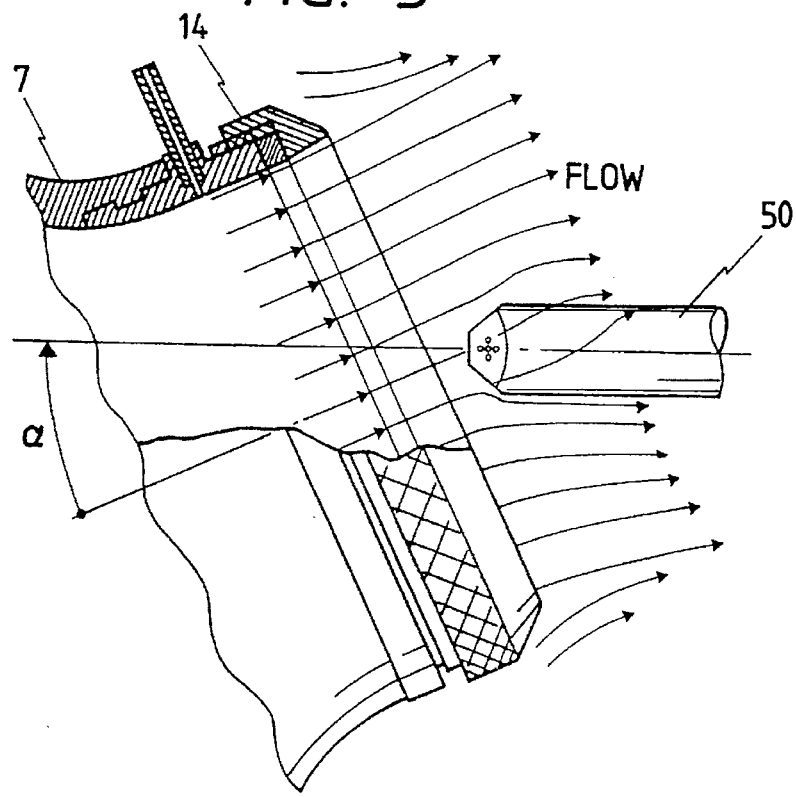
FIG. 5 is a partially sectional side view of a nozzle blow port in the state where the multi-hole turbulence plate is removed.

As shown in FIG. 3, the small wind tunnel portion 2 is composed of a flow generation tubular portion 5, a honeycomb type straightener 6, and a nozzle 7. The flow generation tubular portion 5 is provided with an axial fan 8, a stationary blade 9, and a bearing 11 for supporting an electrical motor 10 for driving the axial fan at a diametrically central part. The honeycomb type straightener 6 is provided with a straightening honeycomb 12 and a net 13. A multi-hole turbulence plate 15 (FIG. 4) is mounted on a nozzle blow port 14 of the nozzle 7, if necessary. A safety protective net 16 is provided at an inlet end of the flow generation tubular portion 5, if necessary. The electrical motor 10 is provided with a suitable revolution indicator 17 for detection of the number of revolutions. It is to be noted that the flow generation tubular portion, the honeycomb type straightener and the nozzle are not necessarily constituted by separate members but may be formed integrally or may be divided into a plurality of sections and connected with each other, as shown in the figure.

Figure 1:
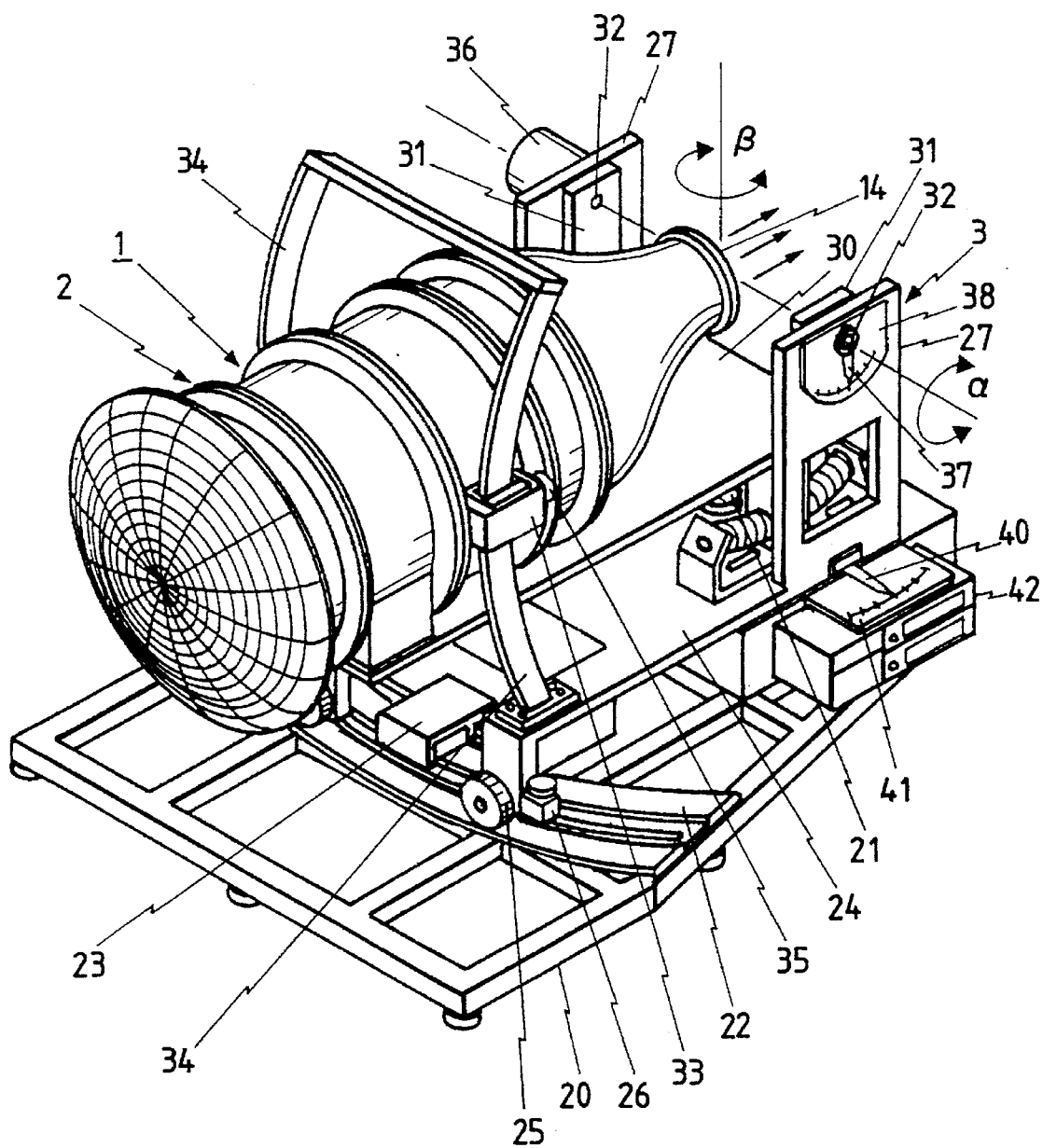
FIG. 1 is a perspective view of the transportable three-dimensional calibration wind tunnel system according to one embodiment of the present invention.
Figure 2:
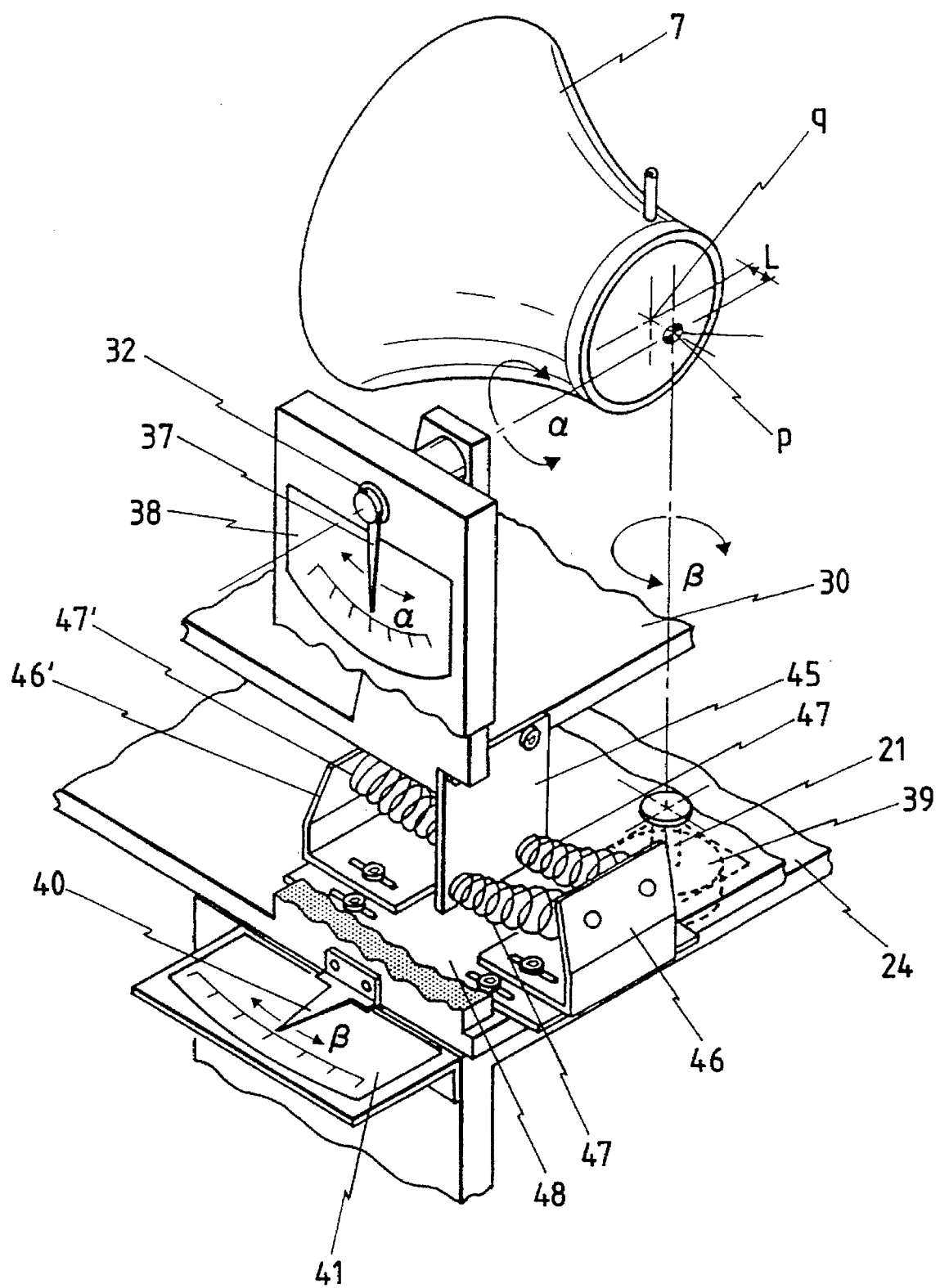
FIG. 2 is an enlarged view showing essential parts of the transportable three-dimensional calibration wind tunnel shown in FIG. 1.

As clearly shown in FIGS. 1 and 2, the small wind tunnel portion 2 is installed on a base 20 through the active two-axis rotational deformation device 3 composed of an α rotational deformation device portion and a β rotational deformation device portion. The β rotational deformation device portion has one end whose central portion is secured to a β angle shaft 21 vertically supported on the base 20, while the other end thereof has a β rotational deformation base 24 to which is secured a β rotational deformation actuator 23 which is driven so as to move along a circular guide rail 22 provided on the base 20, the β rotational deformation base 24 being provided to be rotated horizontally about the β angle shaft 21. In the present embodiment, the β angle guide rail 22 and the β rotational deformation actuator 23 constitute a linear motor, which is rotated at a suitable angle in response to a signal from a control power supply device 42. Reference numeral 25 designates a guide roller provided at the end of the β rotational deformation base and which is moved along the guide rail 22. Reference numeral 26 designates a β angle stopper for securing the β rotational deformation base 24 at a suitable angle on the guide rail, which is used when manually adjusted.

The α rotational deformation device portion has an α rotational deformation base 30, and an α-shaft fixed bracket 31 is stood upright on one end of the α rotational deformation base 30. An α-shaft 32 secured horizontally to the α-shaft fixed bracket is supported on an α-shaft support bracket 27 stood upright on one end of the β rotational deformation base 24. The small wind tunnel portion 2 is placed on and secured to the α rotational deformation base 30. An α rotational deformation actuator 33 secured to the tubular portion of the wind tunnel and an α-angle guide rail 34 stood upright on the β rotational deformation base constitute a linear motor, and the α rotational deformation base 30 can be rotated at a suitable angle vertically about an α-shaft 32 in response to a signal from the control power supply device 42. Reference numeral 35 designates a manual α-angle stopper.

The α-shaft 32 and the β-shaft 21 are arranged so that their axes intersect at right angles, and the small wind tunnel 2 is secured to the α rotational deformation base 30 so that the nozzle axis of the small wind tunnel 2 passes a point P where the α-axis and the β-axis intersect at right angles (FIG. 2) and a center point q of the nozzle blow port 14 is positioned away from the point p by a predetermined distance L. Accordingly, the α rotational deformation base 30 and the β rotational deformation base 24 are rotated about the α-shaft 32 and the β-shaft 21 whereby the nozzle axis can be set to a suitable angle within the conical portion about the center point q of the nozzle blow port.

In the present embodiment, the rotational angle of the α-shaft 32 is detected by an encoder 36 provided on the α-shaft and is displayed on an α-angle dial plate 38 secured to the α-shaft support bracket 27 by a pointer 37 provided on the end of the α-shaft. Similarly, the rotational angle of the β-shaft 21 is detected by an encoder 39 provided on the β-shaft and is displayed on an β-angle dial plate 41 secured to the base 20 by a pointer 40 mounted on the β rotational deformation base 24.

While as the rotational deformation device, the linear motor device is employed, it is to be noted that the device is not always limited to one described in the present embodiment but a suitable device such as a ball screw device, a cylinder device or the like can be employed. As an alternative two-axis rotational deformation device, it is possible that the β rotational deformation base is provided on the a rotational deformation base reversely to the former construction, and the small wind tunnel is placed on the β rotational deformation base. Further, the power drive device need not necessarily be provided but the α angle and the β angle may instead be suitably set manually.

In the case where the flow angle is set manually, in the present embodiment, a free vibration mechanism comprising a free vibration spring and an adjusting portion is provided, as clearly shown in FIG. 2, so that the free vibration and the period can be passively varied by the α angle. In FIG. 2, reference numeral 45 designates an operating plate detachably suspended from the α rotational deformation base 30. Springs 47 and 47' are provided on spring mounting plates 46 and 46' adjustably standing upright on the β rotational deformation base 24 through a adjusting flat plate 48 so as to sandwich the operating plate therebetween. The springs 47 and 47' are normally adjusted in their position so that the operating plate maintains its vertical state, that is, the α angle rotational deformation base maintains its horizontal state. The α rotational deformation base 30 can be maintained in the horizontal state by longitudinally adjusting the adjusting flat plate 48.

Accordingly, in the state shown in FIG. 1, in the state where restriction caused by the actuator 33 and the stopper 35 is completely released so that the small wind tunnel 2 can be rotated integrally with the α rotational deformation base 30, when the small wind tunnel portion 2 is pressed downward and released, the small wind tunnel portion 2 freely vibrates about the α shaft 32 and becomes gradually attenuated and stops in a horizontal state. The spring pressure Call be adjusted by adjusting the spacing between the spring mounting plates 46 and 46' to suitably adjust the rate of attenuation. In the case where the rotational deformation device is controlled by the actuator, the free vibration device is removed.

The transportable three-dimensional calibration wind tunnel system is constructed as described above. The output of the axial fan is controlled whereby an airflow without turbulence having a suitable speed of wind or an airflow in a turbulent state can be generated. In addition, the α rotational deformation device and the β rotational deformation device are suitably controlled whereby the direction of wind of an airflow blown out of the nozzle blow port can be suitably controlled to generate an airflow having a large degree of turbulence from a suitable three-dimensional airflow and an airflow having a small degree of turbulence. Accordingly, it is possible to generate the three-dimensional airflow having a wind speed and direction of wind as in a predetermined program.

Since the three-dimensional calibration wind tunnel system according to the present invention can be constructed to be portable, it can be moved to a suitable place. Thus, it is possible to test an air sensor or the like which is mounted on a real airframe, which has been impossible in the conventional wind tunnel test.

The embodiment of the verification method of flight control system of an air active control aircraft having a three-dimensional true airspeed detection system loaded thereon will be described hereinafter with reference to FIGS. 6 to 9.

First, in connection with the present embodiment, an embodiment of the air active control aircraft which is an object to be verified will be described.

The active control device of the air active control aircraft 49 in the present embodiment is mainly composed of a control signal generation system comprising a truncated pyramid-shape Pitot probe 50, an air flight velocity vector processor 51, an on-board control computer 52 and a group of airframe motion detection sensors 53 such as a conventional three-axis gyro, an inertial reference unit and the like, a group of various control actuators 54 for receiving a control signal from the control signal generation system to drive various control surfaces, and a thrust control device 55 for controlling an output of the engine.

Figure 6:
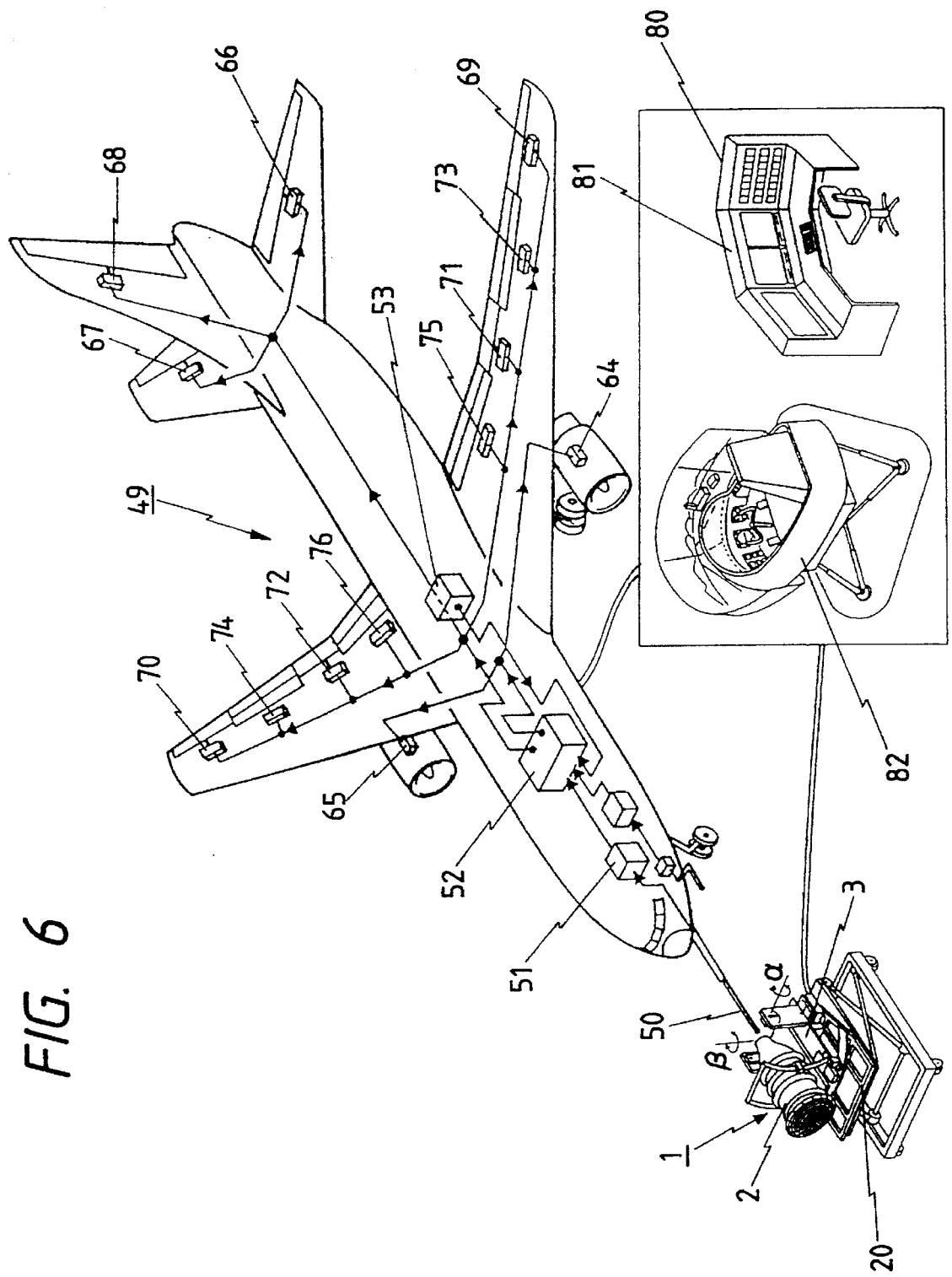
FIG. 6 is a schematic view showing the verification method of a flight control system of an air active control aircraft with an engine according to another embodiment of the present invention.
Figure 7:
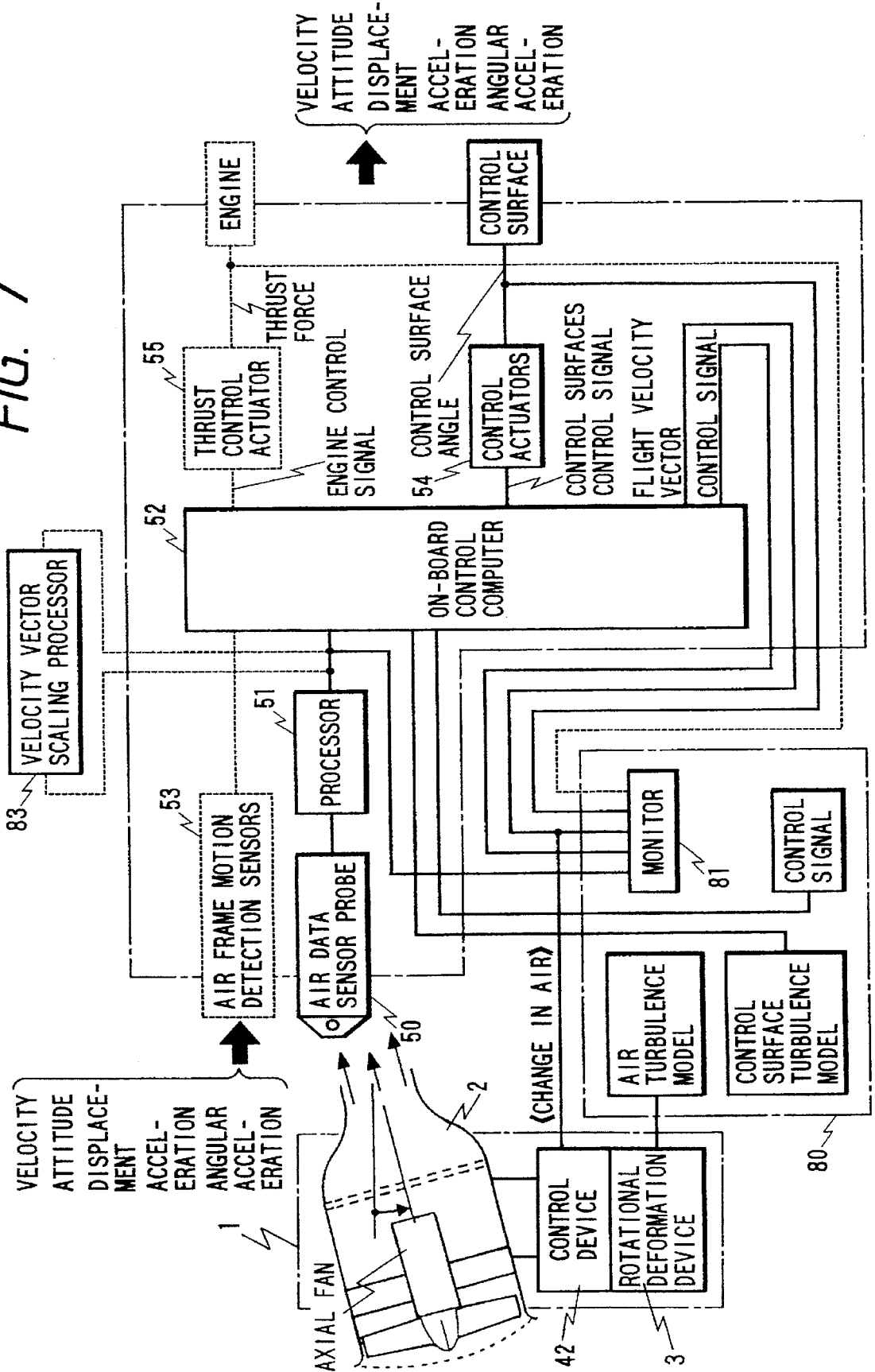
FIG. 7 is a block diagram of the verification method of flight control system shown in FIG. 6.
Figure 8:
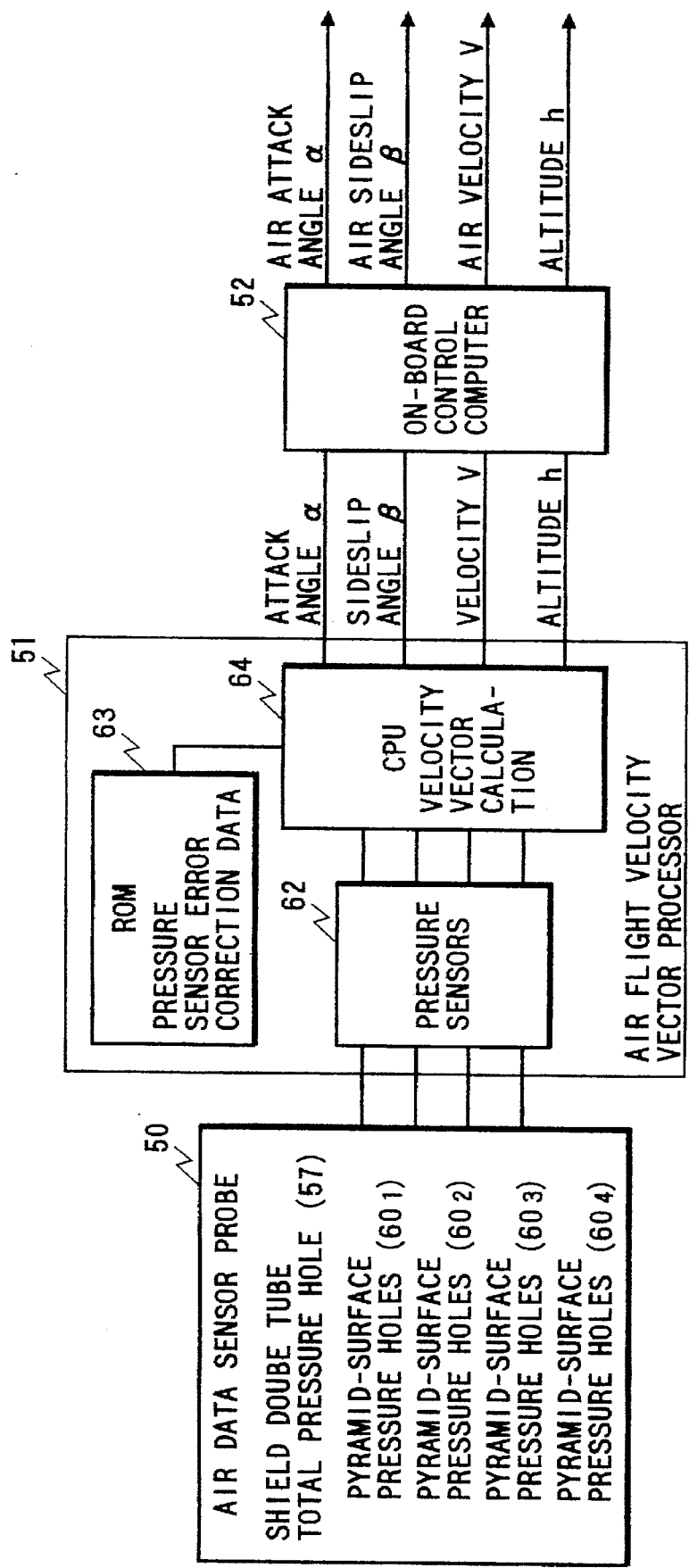
FIG. 8 is a schematic block diagram of the control signal generation system shown in FIG. 7.

The truncated pyramid-shape Pitot probe 50 is provided to project from the extreme end of the aircraft, as shown in FIG. 6, in order to decrease an error in position and to quickly detect a change in airflow in the flight direction. The truncated pyramid-shape Pitot probe 50 has an extreme end shaped in a truncated pyramid-shape and is provided at the apex with a shield hole 57, as shown in FIG. 10. In the center of the probe there is arranged a total pressure tube 56 having a smaller diameter than that of the shield hole, the shield hole 57 being provided at the bottom end with a branch hole 58 to allow a part of the pressure in the shield hole to leak. In each of square pyramid surfaces $59_1$ to $59_4$ are formed a plurality of groups of pressure holes $60_1$ to $60_4$. By positioning the truncated pyramid-shape Pitot probe 50 at the three-dimensional flow, it is possible to measure the total pressure H of the total pressure tube 56 and pressures $P_1$ to $P_4$ of the groups of pressure holes $60_1$ to $60_4$ on the truncated pyramid-surface.

While the truncated pyramid-shape Pitot probe 50 is normally formed as a separate probe, as shown in FIGS. 11A and B, it is to be noted that the probe 50 can be provided directly on a nose portion 111 of a supersonic airframe 110. The construction of a truncated pyramid-shape 5-hole Pitot probe 112 is basically similar to that of the probe described in the above-described embodiment, detailed description of which is therefore omitted.

The air flight velocity vector processor 51 is provided to process the velocity vector from pressures detected by the truncated pyramid-shape Pitot probe 50. As shown in the block diagram in FIG. 8, the aforementioned processor has a pressure sensor 62 for converting the pressure into an electrical signal and a ROM 63 which stores therein advance pressure coefficients for correcting pressure information of the probe 50 obtained by experiments of the wind tunnel, and is composed of a CPU 64 for processing the velocity vector from the pressure information on the basis of the velocity vector analyzing software.

According to the air flight velocity vector processor 51 of the present embodiment, the total pressure H and differentials (H-$P_1$), (H-$P_2$), (H-$P_3$), and (H-$P_4$) can be obtained from the total pressure H measured by the truncated pyramid-shape Pitot probe 50 and the pressures $P_1$ to $P_4$ on the square truncated pyramid-surface. The operation can be executed on the basis of the velocity vector analyzing software from the pressure information and the air temperature sensors to obtain the flight velocity vectors of the true air velocity V, the elevation angle $\alpha$ and the angle of sideslip $\beta$. That is, it is possible to grasp the direction of wind or the like in the flight condition in real time. Further, the altitude h is obtained from static pressure to thereby obtain the rate of climb, and the Mach number is obtained from dynamic pressure and static pressure.

The on-board control computer 52 stores therein airframe and aerodynamic force data bases obtained by the wind tunnel test or the like and engine data bases obtained by the engine performance test in the form of ROM and receives therein programs for predicting the flight conditions induced with respect to the change in airflow on the basis of the control rule and the flight rule from the aforementioned informations to create a flight control law for the air flight stabilization control. For example, as the airframe and aerodynamic data bases, necessary data such as a probe position error table including every elevation angle ($\alpha$ angle) and the angle of sideslip ($\beta$ angle), a table of various coefficients of translational force ($C_L$, $C_D$, $C_Y$) due to the change in $\alpha/\beta$ angle, and a table of various moment coefficients (pitching, yawing, rolling) are stored in ROM. These data are selected by inference, table look-up and interpolation to create the flight control law for every flight configuration during takeoff, cruising and landing.

The flight control law varies with the kind of airframes and varies with the interference and operation procedures. Basically, however, the air flight velocity vector signals (such as the elevation angle $\alpha$, angle of sideslip $\beta$, altitude h signals) and airframe motion detection sensor signals are taken in parallel into a control surface control closed loop system and an engine control closed loop system, and the air flight velocity vector signal induced by the change in airflow is received to predict the flight motion so as to perform the feedback control or feedforward control of the engine thrust and various control surfaces.

Thereby, for example, in the aircraft shown in FIG. 6, from the on-board control computer 52, an engine thrust control command is given to engine thrust control devices 64 and 65, and a control-surface control command is given to control actuators 66 to 76 of main control blade surfaces such as an elevator, a rudder and an aileron and secondary control surfaces such as a spoiler and a high lift device to control the engine and the control surfaces in order to obtain the speed, attitude, altitude, heading orientation and rate of climb (descent) necessary for the stabilized flight of the aircraft with respect to the change in airflow. At the same time, an output from the on-board control computer is displayed on a monitor in a cockpit. If necessary, it is possible to separate the air flight velocity vector signal from the air active control system to perform manual control on the basis of the monitor information.

In order to allow the air active control aircraft constructed as described above to fly in safety, the transportable three-dimensional calibration wind tunnel system is used, and the verification of operation and function of the control surfaces, the evaluation of the flight control law, the flight simulation of a gust of wind or the like and the performance evaluation of controllability are carried out in the following manner, in connection with the real airframe prior to flight and after repairs.

FIG. 6 is a conceptual view of the verification system of the flight control system for the purpose as described above. The verification system of the flight control system according to the present embodiment is composed of an air active control aircraft 49 which is a airframe to be verified, a transportable three-dimensional calibration wind tunnel system 1 installed outside the airframe, an out-board control computer 80, a monitor 81 and a cockpit simulator 82. The cockpit simulator 82 is provided to feel and verify the motion of a airframe created by the operation of various control surfaces resulting from the change in air. However, that is not always necessary in the present verification system.

The out-board computer 80 stores therein ① various air models for example, such as air models at takeoff or at landing, and air turbulence models such as a gust of wind, cross-wind, wind shear, etc., for controlling the transportable three-dimensional calibration wind tunnel system to generate various three-dimensional airflows, ② control turbulence models such as an erroneous control by a pilot, and ③ control system verification software for carrying out the verification of the flight control system by motion of the control surfaces on the basis of the results of the model information given to the air active control aircraft 49.

The out-board computer 80 feeds a flow generation signal for generating a suitable three-dimensional airflow such as air turbulence of cross-wind, a gust of wind and so on to the transportable three-dimensional calibration wind tunnel system 1 to control the latter and to bidirectional signal-bond with the on-board control computer 52 of the air active control aircraft, and monitors the verification of the flight control system caused by various degrees of turbulence, the operation of the on-board control computer and the motion of the air active control aircraft.

The transportable three-dimensional calibration wind tunnel system 1 is installed on the extreme end of the truncated pyramid-shape Pitot probe 50 of the air active control aircraft 49 to generate the three-dimensional airflow whereby the truncated pyramid-shape Pitot probe 50 can obtain simulated air information similar to air information at the actual flight. In that case, the transportable three-dimensional calibration wind tunnel system 1 is installed so that the central portion at the extreme end of the truncated pyramid-shape Pitot probe 50 is positioned at the point p which is the intersection between the $\alpha$ shaft and the $\beta$ shaft of the system 4 whereby the three-dimensional airflow generated by the transportable three-dimensional calibration wind tunnel system 1 becomes the change in air received by the air active control aircraft as it is. Accordingly, an output and a nozzle angle of the fan of the transportable three-dimensional calibration wind tunnel system 1 are controlled on the basis of the control signal from the out-board control computer to thereby suitably create the change in airflow at the standing time received at the time of takeoff and landing, at the time of climbing and descending or at the time of cruising, or the simulated change in air similar to the air turbulence when the crosswind, a gust of wind, a wind shear, etc. occurred to impart them to the truncated pyramid-shape probe 50 of the air active control aircraft 49.

As will be described in detail later in the embodiment of the flight simulator, in the present embodiment, a velocity vector scaling function processor 83 is connected between the air flight velocity vector processor 51 of the air active control aircraft 49 and the on-board control computer 52 at the time of verification in order to enable the verification of the flight control system in a flight region in excess of the generated airspeed ability of the transportable three-dimensional calibration wind tunnel system 1. The velocity vector scaling function processor 83 is designed so that the shift magnification for shifting the actual generated airspeed by a suitable amount in the operation processing is set by the out-board control computer to correct the velocity vector obtained by the air flight speed operation processor in accordance with the shift magnification to provide a continuity whereby the velocity vector at the shifted airspeed can be obtained.

The air flight velocity vector is calculated by the air flight velocity vector processor 51, similarly at the time of actual flight, from the air information obtained from the truncated pyramid-shape Pitot probe 50. The resultant vector is taken into the closed loop control system in parallel with airframe motion detection sensor signals by the on-board control computer 52 to predict the flight motion induced by the change in air, and various control actuators are operated by the feedback or feedforward control. At the same time, the control signal is applied to the out-board cockpit simulator, the out-board control computer 80 and the monitor 81. It is to be noted in this case that the thrust control device 55 for controlling the engine is placed in the inoperative state and only the control actuators are controlled, but the control signal to be fed to the thrust control device is moved out to the out-board control computer as it is for monitoring it.

As the verification method, whether or not the control surface angles obtained by the control actuators quickly and adequately correct the motion of the airframe caused by the airflow changed by the transportable three-dimensional calibration wind tunnel system 1 is verified by the out-board control computer on the basis of the control system verification software stored in advance in the said computer.

Verification items include, for example, ① verification of operation and function of the control surface, ② evaluation of the degree of the control surface angle and the control law of the response time from the change in air to the change in the control surface angle, ③ verification whether or not the flight control law with respect to the air turbulence of a gust of wind or the like given by the transportable three-dimensional calibration wind tunnel system, and ④ evaluation and verification of the control performance of the air active control aircraft by the closed loop control system including a pilot such that the motion of the air active control aircraft and the signal of the air flight velocity vector detection sensor are presented to the pilot by the monitor of the cockpit, the control surface is moved by the control signal generated by the pilot's manual operation and the change in airflow is caused to occur in the transportable three-dimensional calibration wind tunnel system, and evaluation and verification of the controllability including actions of the pilot (for example, such as the operating procedure of rudder and aileron resulting from the turning or the like).

Figure 9:
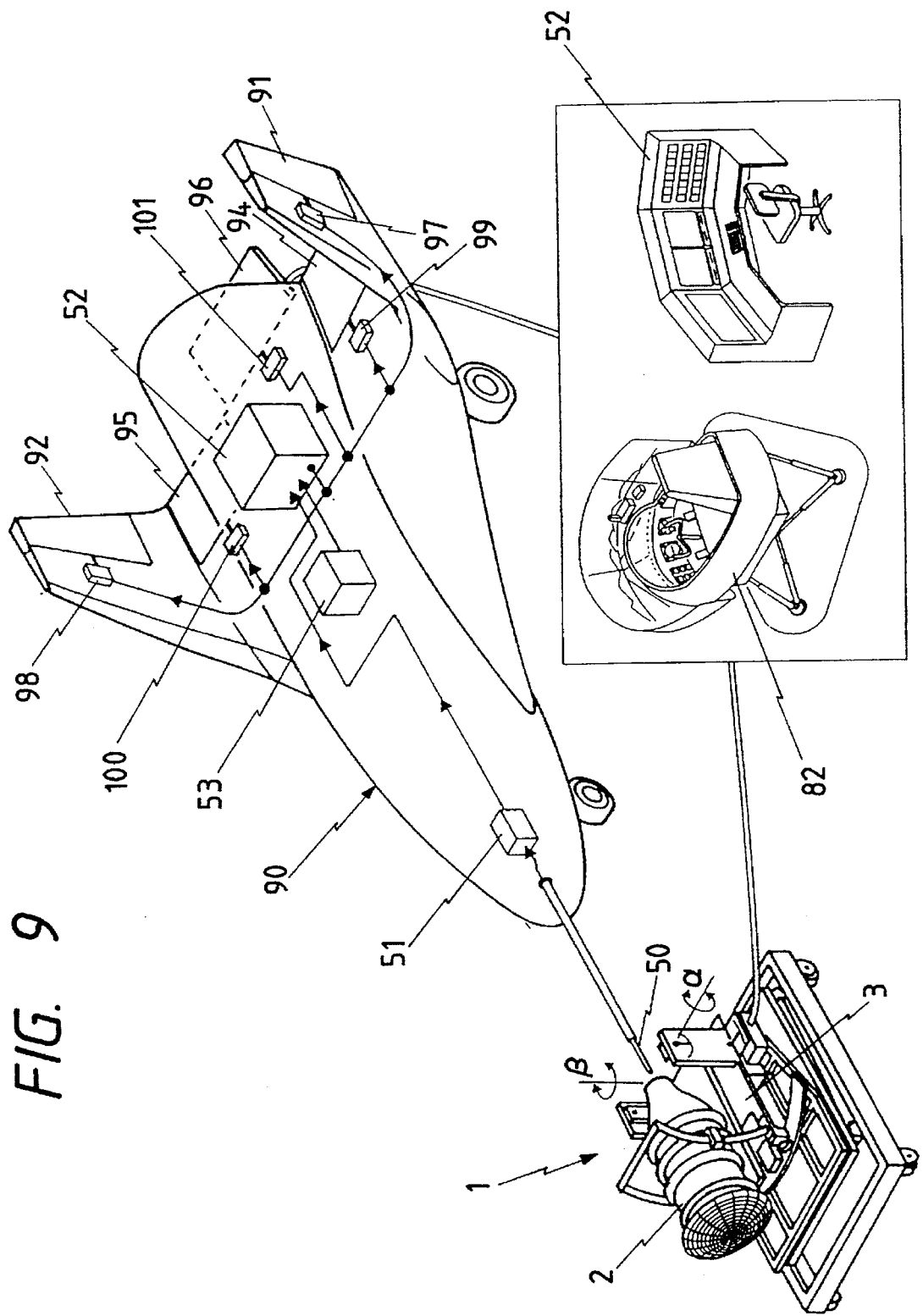
FIG. 9 is a schematic view showing the verification method of flight control system of an air active control aircraft without an engine according to a further embodiment of the present invention.

While in the foregoing, a description has been made of the embodiment of the verification system of the manned air active control aircraft, it is to be noted that the verification system of the present embodiment is likewise applied, as shown in FIG. 9, to the verification of an unmanned engine-less air active control aircraft 90 as a spacecraft under development now. FIG. 9 is a conceptual view of the verification system of the air active control aircraft 90 which is combined with a system such as a Global Positioning System (GPS) to enable the unmanned remote control. FIG. 9 (a block diagram) corresponds to FIG. 7 (a block diagram) from which the lift control device and the engine are removed, though not shown.

The air active control aircraft 90 is substantially similar to the air active Control aircraft 49 of the previously mentioned embodiment except that the engine control closed loop is not provided, and that various flight and navigation data of the output of the on-board control computer are transmitted to the control room on the ground by a data transmitter. Accordingly, in the figure, parts similar to those of the previous embodiment are indicated by the same reference numerals as those of the previous embodiment, detailed description of which is omitted. In the air active control aircraft 90 according to the present embodiment, a control-surface control command is given to control surface actuators 97 to 101 for driving rudders 92, 93, elevons 94, 95 and a body flap 96 by an output signal from the on-board control computer 52, and the control surfaces are controlled to obtained the attitude, heading orientation and rate of descent so that the flight motion induced by the change in air is predicted to enable the stable descent/approach and landing.

One embodiment of the verification method of the flight control system of the air active control aircraft according to the present invention has been described. Aircrafts applicable for the present invention may be of any aircraft which is provided with an air data sensor probe such as a normal civil aircraft, a helicopter, a supersonic airframe, VTOL, (Vertical Take-off and Landing aircraft) an engine-less glider, and so on. Kinds of aircraft are not limited.

An embodiment of a flight simulator of the air active control aircraft making use of the transportable three-dimensional calibration wind tunnel system according to the above-described embodiment will be described hereinbelow in detail with reference to FIGS. 12 to 14.

Figure 12:
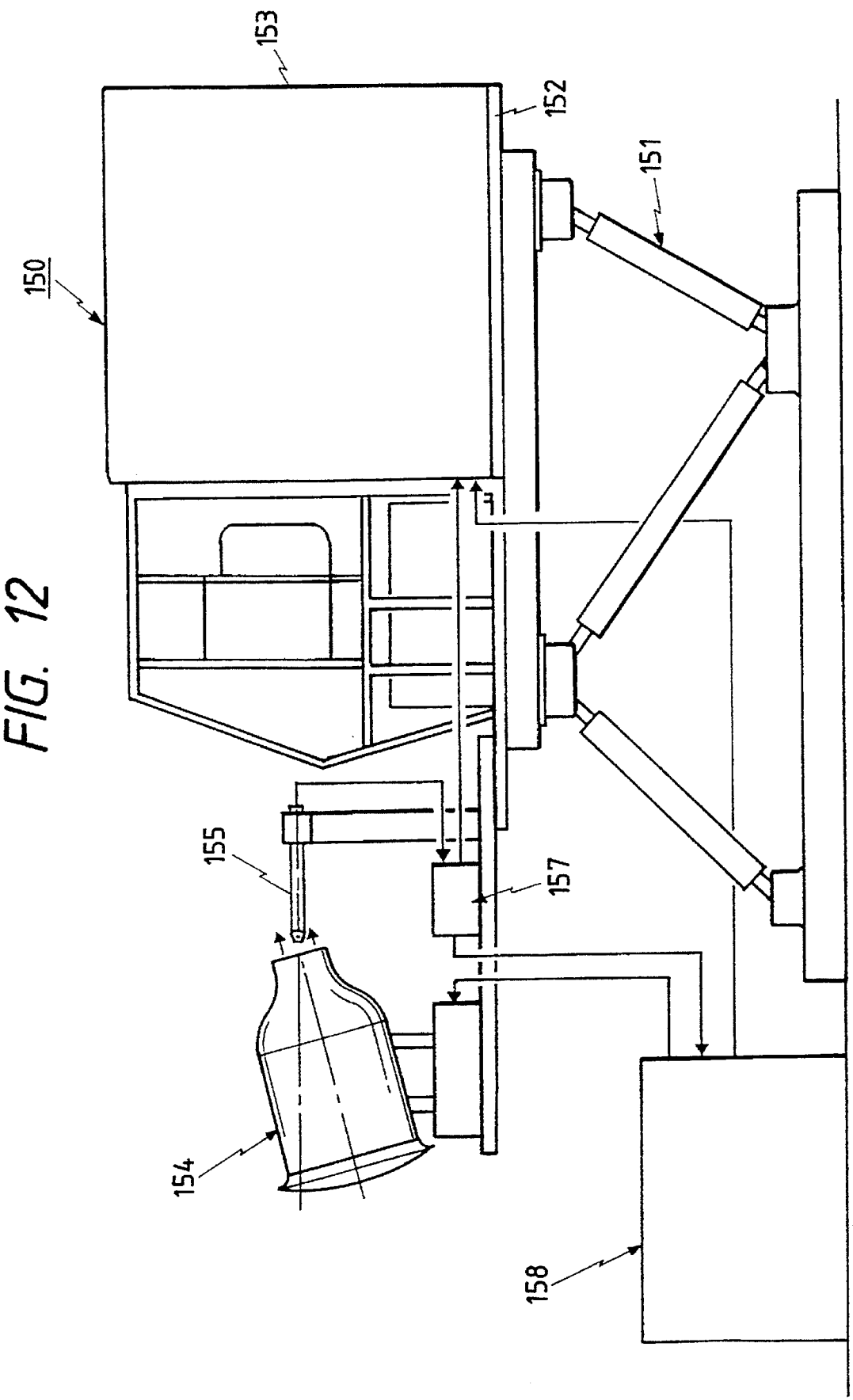
FIG. 12 is a schematic side view of the flight simulator according to another embodiment of the present invention.
Figure 13:
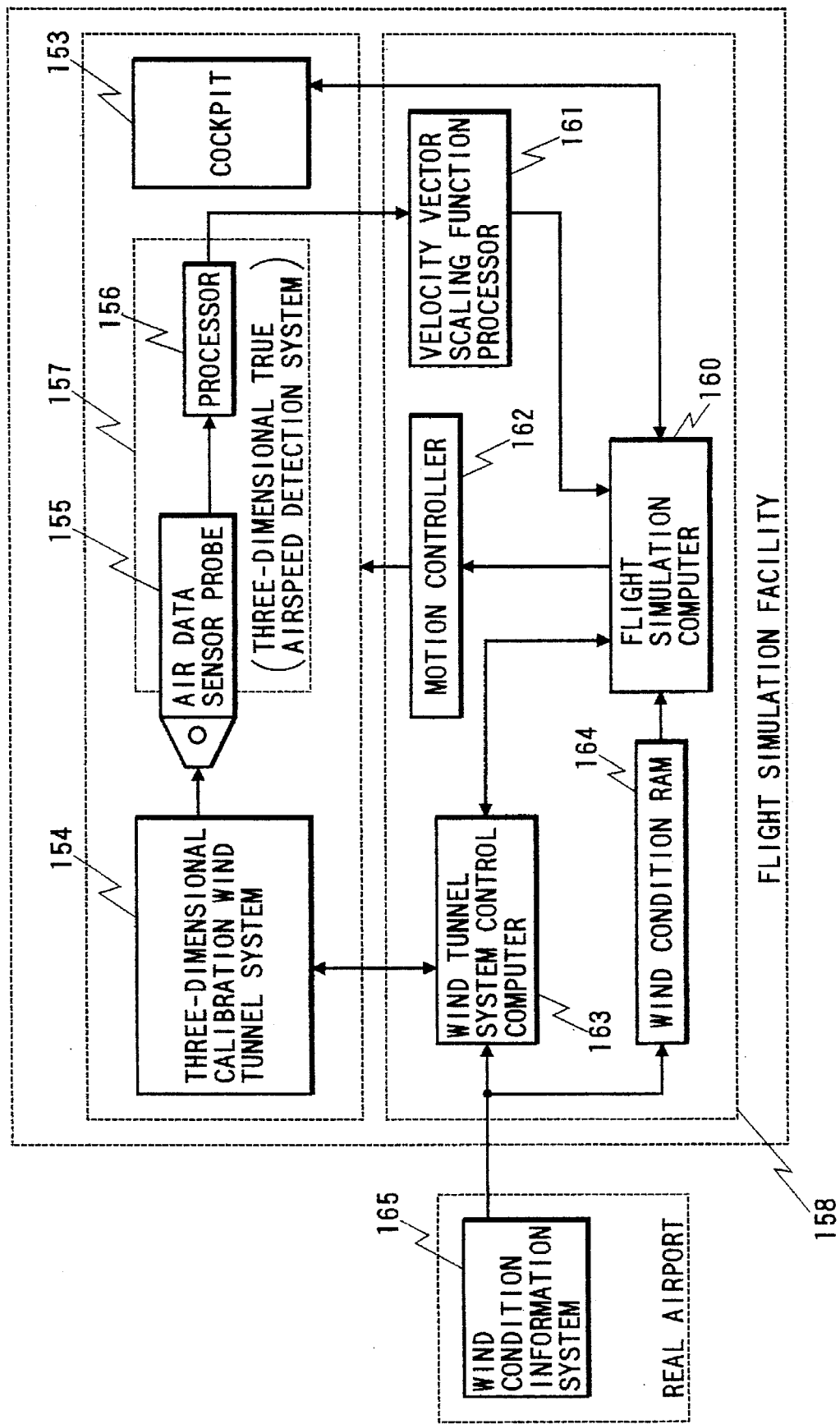
FIG. 13 is a control block diagram thereof.

FIG. 12 is an external view of a flight simulator 150 according to the present invention, and FIG. 13 is a block diagram showing the system construction.

The flight simulator 150 according to the present invention is composed of a simulation cockpit 153 provided on a motion table 152 of a motion simulation device 151 capable of applying a six-degrees of freedom motion by a combination of suitable actuators with a simulation control seat device and a visual simulation device, a transportable three-dimensional calibration wind tunnel system 1, a simulator body loaded with a three-dimensional true airspeed detection system comprising a truncated pyramid-shape Pitot probe 155 for detecting the three-dimensional airflow generated by the three-dimensional calibration wind tunnel system as air information and a three-dimensional true airspeed detection system 157 comprised of an air flight velocity vector processor 156 for operating the velocity vector from the air information, and a control command section 158 such as a control computer installed in a flight simulator facility.

The transportable three-dimensional calibration wind tunnel system 1 and the truncated pyramid-shape Pitot probe 155 are arranged in the relation such that the extreme end of the truncated pyramid-shape Pitot probe is positioned in the central portion at the extreme end of the nozzle blow port similarly to FIG. 6.

The control command section 158 is composed of a flight simulator computer 160, a velocity vector scaling function processor 161 for scaling-function processing a velocity vector from the air flight velocity vector processor 156 on the basis of the scaling function of an airflow generator described later, a motion controller 162 for controlling the motion simulation device 151 by the output of the flight simulator computer 160, an airflow generator computer 163 for controlling the driving of the transportable three-dimensional calibration wind tunnel system on the basis of an airflow generation command from the flight simulator 160, and a wind condition RAM 164.

Further, in the transportable three-dimensional calibration wind tunnel system of the flight simulator according to the present invention, not only the flight simulator computer is allowed to generate an airflow on the basis of airflow information preset to the flight simulator computer but also the airflow generator control computer 163 is connected to a wind information system 165 in an airport through a telemeter or optical communication to receive airflow information (such as wind velocity, direction and altitude) generated in a real airport so that the same airflow as that in the real airport is generated at real time to perform the flight simulation on the basis thereof. Further, the airflow information from the airport is divided, for example, every season and every time, a number of which are stored in the wind condition RAM 164. Specific airflow information is called from the RAM by the simulator computer when necessary to give it to the airflow generator control computer whereby the flow generation conditions peculiar to the airport are reproduced by the three-dimensional calibration wind tunnel system according to the season or time zone to enable the flight simulation training at the time of takeoff and landing.

Furthermore, the simulator according to the present invention has a scaling function capable of generating a simulation wind velocity different from the actual wind velocity in order that the three-dimensional calibration wind tunnel system enables the simulation flight experiment with wind velocity other than that can be generated. For example, in the case where a possible wind velocity region of the three-dimensional calibration wind tunnel system is less than 60 m/s, the simulation flight can be experimented with the real wind velocity as the standby speed at the time of takeoff/landing and descent in the normal airframe in the aforesaid wind velocity region. However, the simulation flight cannot be made with the real wind velocity as the air speed greater than 60 m/s.

Figure 14:
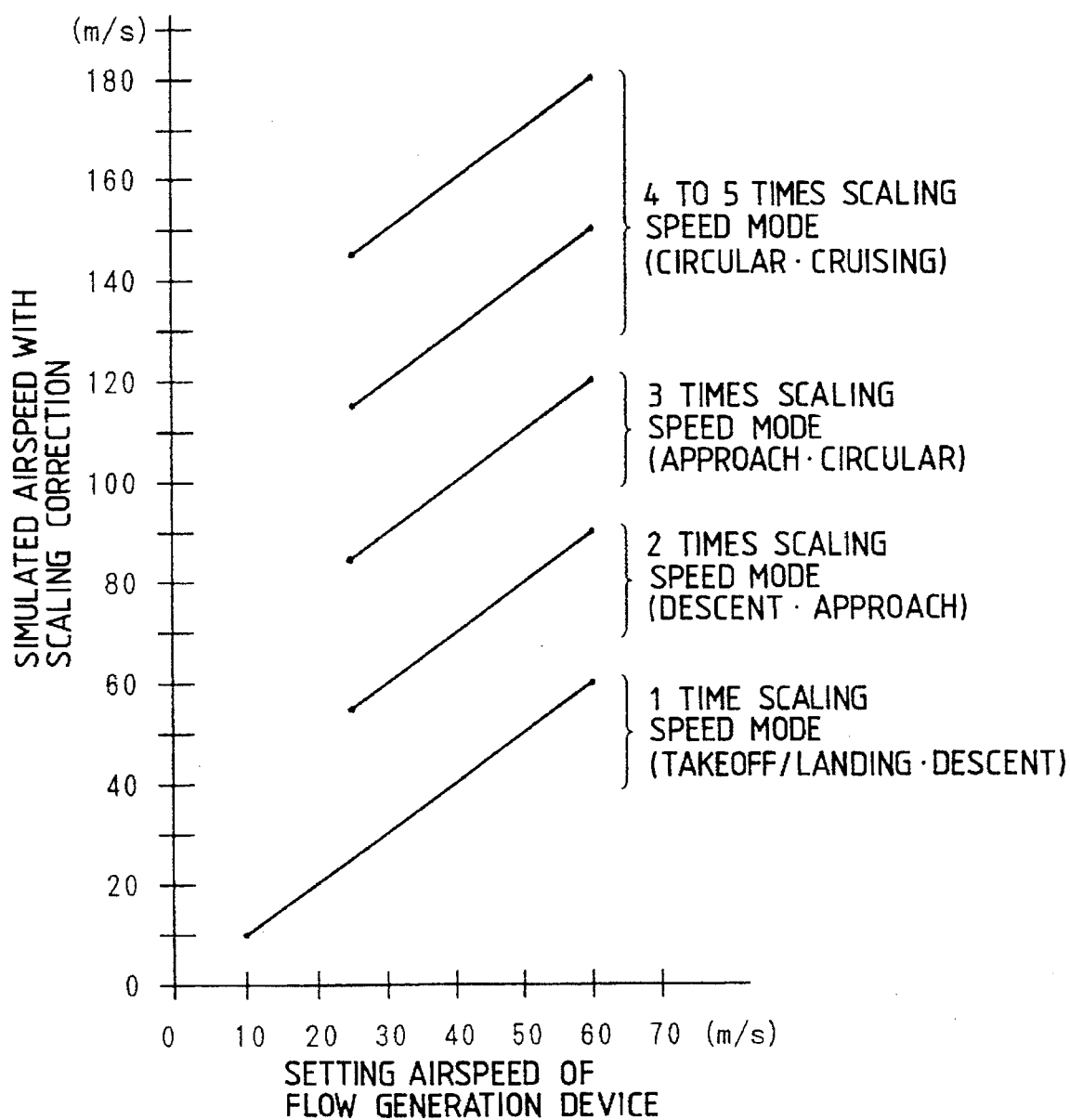
FIG. 14 is a diagram showing the relationship between the set airspeed of the three-dimensional flow generation representative of the scaling function and the simulated airspeed after scaling process.

In view of the foregoing, in the present embodiment, an airflow generated by the three-dimensional calibration wind tunnel system is allowed to have the scaling function as shown in FIG. 14, and the wind velocity generated by the three-dimensional calibration wind tunnel system is allowed to have a continuity of specific magnification to add the shift amount so that the simulation air flight using the truncated pyramid-shape Pitot probe is made possible up to a speed region (low speed to subsonic speed) by which a similarity in the velocity vectors is secured.

In the present embodiment, a scaling mode is set in which as shown in FIG. 14, the shift amount is set to 25 m/s, which can be continuously converted into a 5-stage overspeed in which the shift amount can be added by 1 to 5 times to the wind velocity generated by the three-dimensional calibration wind tunnel system so that the simulation wind velocity of 180 m/s can be generated and the simulation up to the air speed of the subsonic flight can be made. In the case where the overspeed mode is employed, the flight velocity vector detected by the air flight velocity processor 156 is converted into the velocity vector corresponding to the wind velocity according to the overspeed by the velocity vector scaling function processor 161 and input into the flight simulator computer 160. Thereby, the simulation at the time of takeoff at which particularly a change in air is great can be made even in a supersonic airframe using a small and energy saving three-dimensional calibration wind tunnel system, and with less simulation noise.

The flight simulator according to the present invention is constructed as described above. The simulation training of the motion performance of an aircraft, particularly the air active control aircraft can be carried out in three methods as follows:

First, only the flight simulator computer 160 and the simulation cockpit 153 are communicated through a bidirectional communication, similarly to the conventional flight simulator, whereby the flight simulation is carried out in the method similar to the conventional motion simulator on the basis of the simulation software of the aircraft stored in the flight simulator computer.

In a second method, which is a characteristic method of the flight simulator, a flight control law is generated on the basis of the actual change in airflow to cause a pilot to monitor motion of the aircraft caused by the change in airflow to effect the control training. In this method, the flight simulator computer 160 instructs the airflow generator control computer 163 to generate a predetermined air turbulence whereby the three-dimensional calibration wind tunnel system 1 is driven by the airflow generator control computer 163 as described in detail in the previous embodiment to generate an airflow having a predetermined wind velocity and direction of wind. The airflow is detected by the truncated pyramid-shape Pitot probe 155, and the flight velocity vector is generated by the air flight velocity vector processor 157. A motion simulator control signal based on a control law of the aircraft is sent by the flight simulator computer according to the flight velocity vector to the motion controller and the visual simulation device of the cockpit to generate the motion corresponding to the air velocity vector whereby the air flight corresponding to the change in air can be simulated.

Therefore, according to the flight simulator of the present invention, motion based on the actual change in airflow can be generated, and more practical flight motion can be simulated as compared with the conventional motion simulator for generating motion resulting from the change in airflow by a simulation airflow signal which numerically input. Further, air turbulence, for example, such as a gust of wind, is generated by the three-dimensional calibration wind tunnel system, a velocity vector based on the air turbulence is presented to a pilot within the cockpit, and a signal generated by the control made by the pilot is brought into engagement with a signal of the change in air to generate a control law whereby more practical simulation with respect to the air turbulence can be simulated.

Further, in a third method, which is more realistic than the second method, a change in air at the time of takeoff and landing in a specific airport is reproduced in real time or at suitable time, and the motion performance at the time of takeoff and landing at the airport of the air active control aircraft can be simulated on the basis thereof. That is, the aerodrome information system 165 in the airport is connected through a telemeter or optical communication to receive airflow information (such as wind velocity, direction and altitude) generated in the actual airport so that the same airflow as that of the airport is generated in real time, on the basis of which the air flight velocity vector is presented to the pilot within the cockpit to enable the flight simulation. Training similar to that of the takeoff and landing operation in the actual airport can be accomplished by the flight motion simulation.

Further, the air information from the airport is divided, for example, every season and every time, a number of which are stored in the wind condition RAM 164. Specific airflow information is called from the RAM by the motion simulator computer when necessary to give it to the airflow generator control computer whereby the flow generation conditions peculiar to the airport are reproduced by the three-dimensional calibration wind tunnel system according to the season or time zone to enable the flight simulation training.

While in the above-described embodiment, the transportable three-dimensional calibration wind tunnel system and the truncated pyramid-shape Pitot probe are provided on the motion table, it is to be noted that these are not necessarily provided on the motion table but they may be installed at a separate position away from the simulator body.

What is claimed is:

1. A transportable three-dimensional calibration wind tunnel system comprising:

a small wind tunnel portion having a nozzle for creating a three-dimensional airflow having a suitable wind velocity; and a two-axis rotational deformation means connected to said small wind tunnel portion for causing said wind tunnel portion to effect a conical motion with a nozzle blow port being in close proximity to an apex to suitably change a flow angle.

2. The transportable three-dimensional calibration wind tunnel system according to claim 1, wherein said small wind tunnel portion further comprises:

an airflow generating tubular portion; and a honeycomb type straightener, said airflow generating tubular portion being provided with an axial fan constituting a movable blade, a stationary blade, and an electric motor for driving the axial fan.

3. The transportable three-dimensional calibration wind tunnel system according to claim 1 or 2, wherein a multi-hole turbulence plate is detachably mounted on the blow port of said nozzle.

4. The transportable three-dimensional calibration wind tunnel system according to claim 1, wherein said two-axis rotational deformation means comprises:

an $\alpha$-angle rotational deformation device; and a $\beta$-angle rotational deformation device, said $\beta$-angle rotational deformation device having a $\beta$-angle deformation base to be rotated horizontally, said $\alpha$-angle rotational deformation device having an $\alpha$-angle deformation base supported on said $\beta$-angle deformation base to be rotated vertically, said small wind tunnel portion being installed on said $\alpha$-angle rotational deformation device, and a rotational axis of the $\alpha$-angle deformation base, a rotational axis of the $\beta$-angle deformation base and a center axis of the small wind tunnel portion are arranged so that they intersect at a point.

5. The transportable three-dimensional calibration wind tunnel system according to claim 4, wherein said two-axis rotational deformation means is an active type two-axis rotational deformation device in which said $\alpha$-angle deformation base and said $\beta$-angle deformation base are controllably driven by driving devices, respectively.

6. The transportable three-dimensional calibration wind tunnel system according to claim 4, wherein said two-axis rotational deformation means is a passive type two-axis rotational deformation device in which the $\alpha$-angle deformation base and the $\beta$-angle deformation base can have angles set manually, and at least said $\alpha$-angle deformation base has a free vibration mechanism comprising a freely vibrating spring and an adjusting portion.

* * * * *